Figures 1, 2, 3:
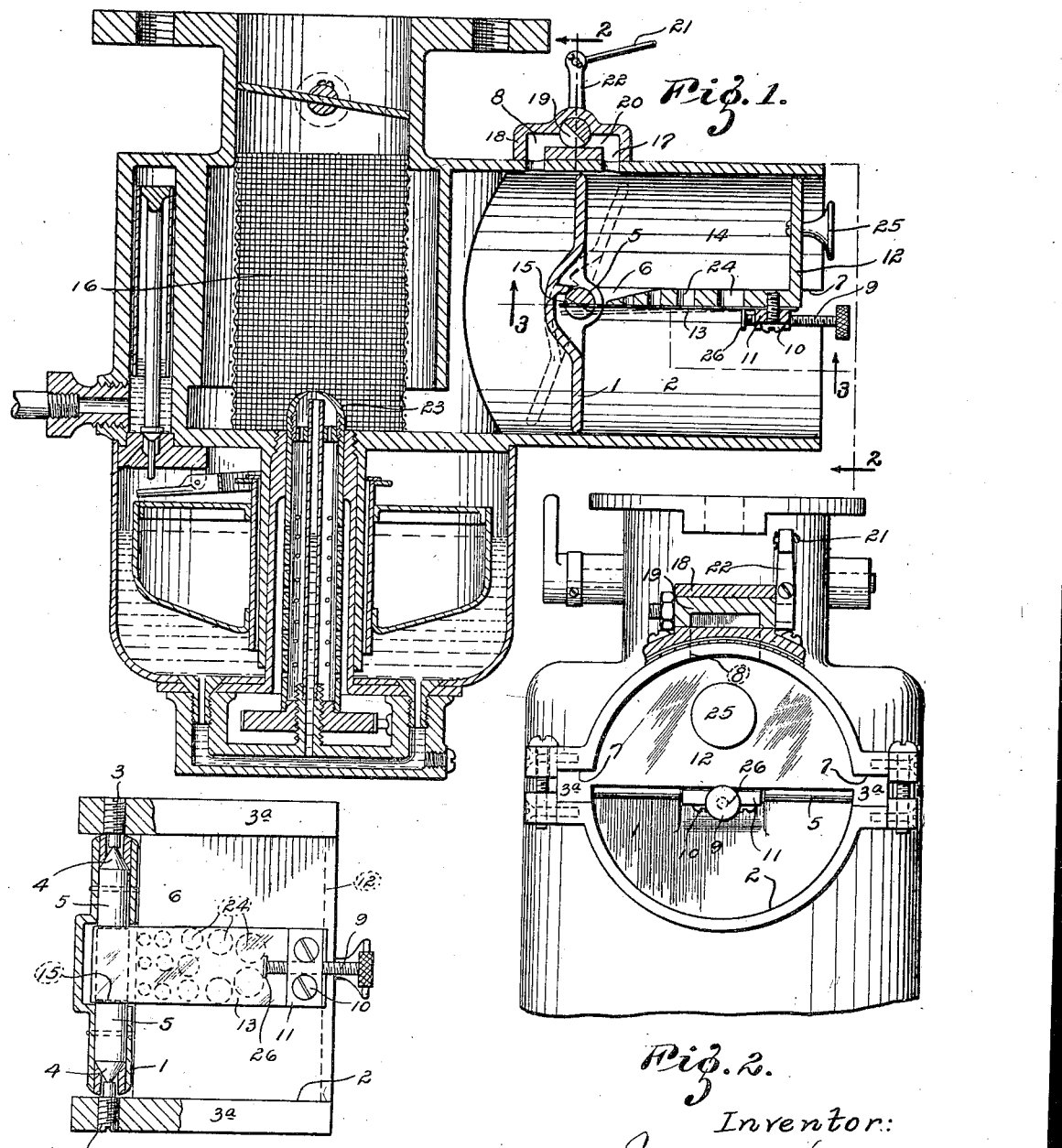

June 12, 1923.  J. V. HENLEY  1,458,578
CARBURETOR
Filed March 14, 1921

Inventor:
Joseph V. Henley.
By Hugh K. Wagner
Att'y.

Patented June 12, 1923.

1,458,578

UNITED STATES PATENT OFFICE.

JOSEPH V. HENLEY, OF ST. LOUIS, MISSOURI.

CARBURETOR.

Application filed March 14, 1921. Serial No. 451,943.

*To all whom it may concern:*

Be it known that I, JOSEPH V. HENLEY, a citizen of the United States, residing at the city of St. Louis, in the State of Missouri, have invented certain new and useful Improvements in Carburetors, of which the following is a specification.

This invention is an improvement in the automatic air-control inlet-valve for the carburetor disclosed in this inventor's prior Patent No. 1169483, dated January 25, 1916, and the details of the construction of that carburetor will not be here repeated.

This valve may be used with carburetors other than the one mentioned above, but that one is referred to as illustrative of the uses of this valve.

In the accompanying drawings forming part of this specification, in which like numbers of reference denote like parts wherever they occur, Figure 1 is a vertical cross-section through a carburetor, showing this present invention as an attachment thereto;

Figure 2 is an end and partial sectional view of this attachment, taken on the line 2—2 of Fig. 1 and showing it in an intake pipe leading to a carburetor; and Figure 3 is a plan and partial sectional view of this attachment, taken on the line 3—3 of Fig. 1 and showing the butterfly valve in section, held by a removable and adjustable partition.

The object of the invention is to provide a valve having as little frictional resistance as possible to its opening movement, and to provide novel and improved means for controlling the movements of such valve.

The vacuum that may be established in the mixing chamber is controlled by this device, by reason of its extreme sensibility and its quick inlet of air to exactly the amount necessary to draw the correct amount of fuel from the nozzle, and the said sensibility is due to the fact that this valve, of butterfly type, is pivoted on two hardened steel center-points supported on these two hardened steel center-points by two hardened steel socket screws, whereby the mechanical friction is reduced to the minimum. Moreover, this valve is proportioned in diameter to give the least possible clearance to the bore of the intake-pipe.

The butterfly valve 1 is shown in full lines in closed position, and in dotted lines in open position, in Figure 1. This valve is located in the intake-pipe 2 and is supported by lugs 3ª extending from the partition 6 in which are seated, or screwed, two hardened steel socket-screws 3, in the cavities of which are seated two hardened steel center-points 4 upon the ends of shaft 5.

Shaft 5 runs through the center of valve 1, the edges of valve 1 reaching to and closely fitting the inside of the wall of the intake-pipe 2.

The shaft 5 is journaled in the socket-screws 3 mounted in the lugs 3ª of the central longitudinal partition 6, fitting in central and longitudinal slots 7 in the intake-pipe 2. The said partition 6 is removable and adjustable longitudinally in the slot 7 to various positions relative to the interior wall of the intake-pipe 2 and the port 17 therein. The said adjustment can be made by a screw (not shown) or by handle 25, if desired.

At the end of the partition 6 away from the valve 1, a semi-circular wall 12 closes one-half the opening of the intake-pipe 2, thereby creating a chamber between the valve 1, and the said wall 12, and the partition 6, and the wall of the intake-pipe 2.

When the valve 1 is at a right-angle to the partition 6 and the wall of the intake 2, the valve 1 is held in such position by flat-spring 13, which is fastened to the partition 6 at its end, near wall 12. The said spring 13 lies flat against the side of the partition, outside of the chamber 14.

This flat-spring 13 is preferably about three-fourths of an inch in width and fifteen one-thousandths of an inch in thickness. It extends from the end of the central partition 6, near the wall 12 along its center, to come in contact with the shaft 5 bearing both center-points 4. The central part 15 of shaft 5 is cut away about one-half, so as to permit the spring 13 to extend slightly over the remaining flat surface of shaft 5. This construction enables the spring 13 to return the valve 1 to position at a right-angle to the partition 6, and at a right-angle to the wall of the intake-pipe 2.

The butterfly valve 1, standing in a right-angular position to both the partition 6 and the wall of the intake-pipe 2, can not be moved by vacuum established in the mixing-chamber 16, as the pull of the vacuum, (being perfectly balanced on both wings of the butterfly valve 1,) prevents admission of air, except through the clearance between the valve 1 and the inside of the wall of the intake-pipe 2, which is very slight. In order, however, to overcome this perfectly balanced influence of the vacuum, port 8, opening on the vacuum side of the valve 1, is cut through the wall of the intake-pipe 2. Another port 17 is similarly cut in the same wall of the intake-pipe 2 on the chamber side of valve 1, and cup, or casing, 18 incloses both port 8 and port 17. A valve 19 is located within the said casing 18, in the passage 20, between the ports 8 and 17, and communication is thus variably established between the vacuum and the air-side of the valve, 1, which passage is controlled by the valve 19. The manipulation of the said valve is controlled by a rod, or wire, 21, or other means, which extends from the operator's position to the lever 22, which operates valve 19 to open or to close the same. Thus a vacuum of the desired degree can be established in chamber 14, so that an unbalanced pressure on the two sides of the valve is maintained, this unbalanced pressure causing the valve to open.

On the slightest movement of the butterfly valve 1 in the direction of opening for admission of air by the influence of the vacuum, the flat surface 15 on the shaft 5 begins to flex the flat-spring 13, and thus creates a tension on spring 13, which in turn creates a resistance to the movement of the valve 1.

As the butterfly valve flexes the spring 13, which spring normally lies flat against the partition 6, it opens the portholes 24, through the partition 6, leading to the chamber 14. The said portholes can be of any number or fixed capacity, or controlled capacity, on the inside of chamber 14. The flow of air through ports 24 reduces the vacuum in chamber 14 thus reducing the force tending to open the valve 1. The valve therefore does not open as rapidly as it would if the openings 24 were not provided, and a higher degree of vacuum is therefore maintained in the carburetor passage than would otherwise be the case. This higher vacuum will cause a greater flow of air through the atomizer passage 23 and a correspondingly greater flow of fuel.

The admission of air through the ports 24 as well as the flexing of the spring 13 tends to oppose the opening movement of the valve 1. Therefore, the provision of the holes 24 permits the use of a weak spring, thus reducing mechanical friction to a minimum.

As the wing of the butterfly valve 1 that forms a part of the chamber 14 opens into that chamber and passes the port 17, and is adjusted longitudinally of the intake-pipe 2, with relation to the said port 17, by screw (not shown) or handle 25, it can be so arranged as to pass port 17 with a very slight movement, thus decreasing the vacuum influence in the chamber 14, and this, in turn, increases the flow of air through the atomizer relatively adjusted and thereby destroys the influence of the vacuum through the port 8, the flow of air through the portholes 24 passing over the wing of valve 1 forming part of chamber 14. This permits a wide range of flexibility and very sensitive action and quick response to all requirements, and with a minimum of mechanical friction. This insures sensitive action and influence of the vacuum on the atomizer subject to regulation and adjustment. This permits the use of low-grade fuel with a greater degree of efficiency under all atmospheric conditions. It enables, also, the use of cold air. In other words, preheated air is not entirely necessary. Cold air gives greater expansive force to the gas for all classes of internal combustion engines.

This butterfly valve construction permits its movement both backward and forward from the normal right-angular position, and allows free action for backfiring, or choking, due to reverse of vacuum in the mixing chamber, caused by pressure from exploding gases, or reversed piston action, due to accident, or otherwise. Practically the same slight resistance is offered by this reverse action of the butterfly valve 1 that is offered for the intake of air, and with equal celerity the valve 1 is returned to its normal right-angular position for instant service with a minimum of mechanical friction.

The handle 25 is provided for ease in movement or removal of the valve as a whole, including the parts that assist in forming chamber 14.

Thumb screw 9 is an adjustment means for increasing or decreasing the tension of flat spring 13, and carries a disk 26 or the like that comes in contact with the surface of said spring 13 and by movement forward or backward will increase or decrease length of action of said spring 13.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a carburetor, an air intake pipe, a casing mounted on said intake pipe, a valve controlled passage in said casing, a butterfly valve located in said intake pipe, said valve controlled passage constituting a by-pass around said butterfly valve, and means for longitudinally moving the butterfly valve in relation to the by-pass.

2. A carburetor attachment comprising a casing mounted on the intake-pipe, a passage leading through the said casing, a valve located in the said passage, a butterfly valve located in the intake pipe between the two ports of the said passage, the said butterfly valve being adapted to close the intake-pipe, a chamber within the intake-pipe, one wall of which is formed by the said butterfly valve and one port of the said passage being normally within the said chamber, and a partition forming another wall of the said chamber.

3. A carburetor attachment comprising a casing mounted on the intake-pipe, a passage leading through the said casing and valve located in the said passage, a butterfly valve located in the intake pipe between the two ports of the said passage, the said butterfly valve being adapted to close the intake-pipe, a chamber within the intake-pipe, one wall of which is formed by the said butterfly valve and one port of the said passage being normally within the said chamber, and a partition forming another wall of the said chamber, the said partition containing ports normally closed.

4. A carburetor attachment comprising a casing mounted on the intake-pipe, a passage leading through the said casing, a valve located in the said passage, a butterfly valve located in the intake pipe between the two ports of the said passage, the said butterfly valve being adapted to close the intake-pipe, a chamber within the intake-pipe, one wall of which is formed by the said butterfly valve and one port of the said passage being normally within the said chamber, and a partition forming another wall of the said chamber, the said partition containing ports normally closed, and a flat spring by which the said ports are normally closed.

5. A carburetor attachment comprising a casing mounted on the intake-pipe, a passage leading through the said casing, a valve located in the said passage, a butterfly valve located in the intake pipe between the two ports of the said passage, the said butterfly valve being adapted to close the intake-pipe, a chamber within the intake-pipe, one wall of which is formed by the said butterfly valve and one port of the said passage being normally within the said chamber, and a partition forming another wall of the said chamber, the said partition containing ports normally closed, and a flat spring by which the said ports are normally closed, the said butterfly valve having a shaft with a cut-away part with which the said spring is in contact.

6. A carburetor attachment comprising a casing mounted on the intake-pipe, a passage leading through the said casing and valve located in the said passage, and butterfly valve located in the intake pipe between the two ports of the said passage, the said butterfly valve being adapted to close the intake-pipe, a chamber within the intake-pipe, one wall of which is formed by the said butterfly valve and one port of the said passage being normally within the said chamber, and a partition forming another wall of the said chamber, the said partition containing ports normally closed, and a flat spring by which the said ports are normally closed, the said butterfly valve having a shaft with a cut-away part with which the said spring is in contact, the said cut-away part of the said shaft being adapted upon partial rotation of the said shaft, by the tilting of the butterfly valve, to lift the said spring off the said ports and to open the same.

7. In a carburetor, an air intake pipe, means forming a chamber in said intake pipe, said means comprising a horizontal partition and two vertical walls, one of said vertical walls constituting a butterfly valve mounted in said horizontal partition a valve controlled by-pass around said butterfly valve and in communication with said chamber, and means controlling communication between the chamber and the air intake pipe.

In testimony whereof I hereunto affix my signature.

JOSEPH V. HENLEY.